Jan. 17, 1928.
E. KREISSIG
1,656,279
SHOCK ABSORBING DEVICE
Filed Feb. 20, 1926
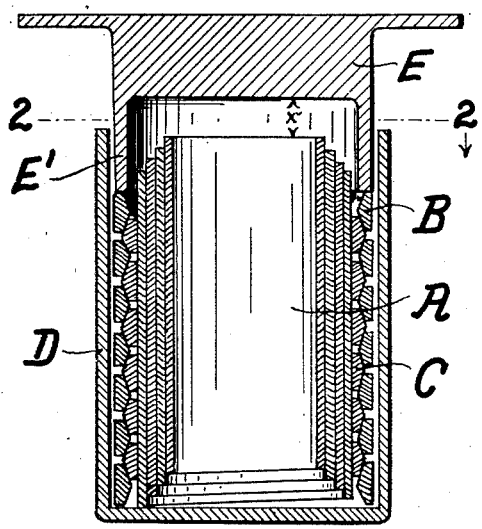
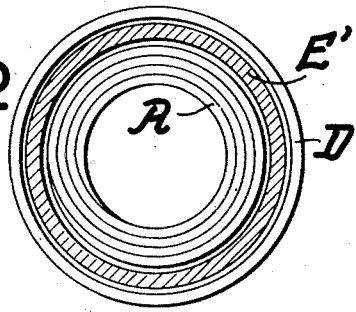
Inventor
Ernst Kreissig
By
Attorney Patented Jan. 17, 1928.

1,656,279

UNITED STATES PATENT OFFICE.

ERNST KREISSIG, OF UERDINGEN, GERMANY.

SHOCK-ABSORBING DEVICE.

Application filed February 20, 1926, Serial No. 89,603, and in Germany March 23, 1925.

This invention relates to combined spring and friction buffers or shock absorbers of that type comprising a plurality of annular spring elements capable, when subjected to compression, of gradually exerting a yielding spring resistance and at the same time generating a frictional resistance.

The present invention provides a construction whereby a new action is obtained by the use of a combination of spiral and ring springs in such manner that a change of diameter of the ring spring unit causes a radial compression of the spiral spring. Heretofore the use in such buffers of a spiral spring subjected to the compressive force of a follower has been suggested for the sole purpose of longitudinally compressing and increasing the torsional action of the spring by means of friction, but in such prior device no radial compression of the spiral spring is effected and the frictional resistance must be kept very low so as not to prevent the complete recoil of the device. My invention secures the double advantage of both longitudinal and radial compression, and the increased cushioning and shock absorbing resistances afforded thereby.

A structure which may be employed for carrying my invention into practical effect is shown in the accompanying drawing, in which:—

Fig. 1 is a longitudinal section through the buffer.

Fig. 2 is a cross-section through the buffer on line 2—2 of Fig. 1, looking downward.

The buffer comprises a spiral spring A, enclosed within a compression ring spring unit, consisting of the inner and outer sets of spring rings B and C. These rings B and C are provided with suitably inclined coacting friction faces. In the present instance, the engaging inclined surfaces of the rings B and C are such that the cross-section of the rings is V-shaped, as shown in Fig. 1, but the arrangement of the inclined friction faces and the cross-section of the individual rings may be varied as desired, so long as the functional actions of the rings are preserved. All three springs may be disposed within a suitable enclosing casing D, said casing being open at least at one end for the reception of the follower E, which is operative to exert a longitudinal compressive force on the members A and B, and both a longitudinal and a radial compressive force on the rings C, and, through radial compression of the rings C, to also radially compress the spiral spring A. The follower E has a precedent engaging portion in the form of a forwardly projecting flange E', which, in the retracted position of the follower, bears on the springs B. During the preliminary motion of the follower, in its working range indicated by $x$ in Fig. 1, the springs B are longitudinally compressed and exert a part of the working force on the springs C, which are likewise partly compressed and contracted, and during this portion of the movement of the follower E the spring A acts as a purely flexural spring. During the remainder of the movement or stroke of the follower E, however, the springs B and C are additionally longitudinally compressed and the springs C are radially compressed, so as to radially compress in turn the spring A, which at the same time is engaged by the body of the follower E and placed under longitudinal compression. By this means a gradually increasing spring resistance and gradually increasing frictional resistance of highly efficient character is produced, and, through the radial compression of the spring A, whereby the coils are brought closer together, and the longitudinal movement of such coils in frictional contact, an increased frictional resistance is established. It will be observed that the spiral spring A is tapered at the ends, so that its outer surface fits snugly against the inner surface of the rings C, while its coils by this construction are rendered free for longitudinal movement and radial expansion under the action of the follower. During the first part of the follower stroke, therefore, the spring A acts as a cushioning spring, whilst on the remainder of the stroke of the follower, the spring A acts both as a cushioning spring and as a torsion spring, this combined action of the spring A allowing great working efficiency to be obtained without complexity of structure. It will, of course, be understood that on the final part of the stroke of the follower, the windings of the coil spring A exert an exceedingly high frictional resistance as a result of their binding action against the springs C as well as their binding action against each other.

It will be observed that the ends of the spring A are reversely tapered, the end convolutions being arranged in stepped or lapping contact with the respectively next adjoining convolution. The effect of this construction is to provide a spring which is collapsible to a certain degree, or in which the coils are longitudinally movable until the ends of the coils at the opposite ends of the spring lie in the same horizontal plane. The coils of spring A, therefore, when compressed on the final motion of the follower E are moved longitudinally downward while being subjected to diametric contraction by the ring units B and C, producing at one and the same time a longitudinal collapsing movement and a spiral winding movement of the coils of the spring A. This double motion of the coils of the spring A increases the frictional buffing resistance set up, so that a maximum amount of resistance may be established by the use of a spring and friction resistance structure of relatively small size.

It will be evident that the members B and C considered as a unit provide an outer spring structure which is longitudinally compressible and contractible and diametrically contractible and expansible in the back and forth movements of the follower, while the member A provides an inner spring structure which is longitudinally compressible and expansible on the forward and backward movements of the follower and diametrically contractible and expansible in the radial movements produced by the diametric contraction and expansion of members C of the outer spring structure.

What I claim is:—

1. A shock absorbing device comprising a compressible and expansible outer ring, an intermediate ring diametrically contractible and expansible under contraction and expansion of the outer ring, an inner longitudinally contractible and expansible and diametrically contractible and expansible ring, adapted to be contacted by said intermediate ring and to contract and expand under the diametrically contracting and expanding movements thereof, and a compressing member operative to first engage and compress the outer ring and partly contract the intermediate ring and then operative to engage both the outer ring and the inner ring and cause the outer ring to radially compress the intermediate ring and the latter to radially compress the inner ring.

2. A shock absorbing device comprising a compressible and expansible outer ring, an intermediate ring diametrically contractible and expansible under contraction and expansion of the outer ring, an inner longitudinally contractible and expansible and diametrically contractible and expansible ring in the form of a volute plate spring having the ends of its convolutions reversely stepped at the ends of the spring and adapted to be contacted by said intermediate ring and to contract and expand under the diametrically contracting and expanding movements thereof, and a compressing member operative to first engage and compress the outer ring and partly contract the intermediate ring and then operative to engage both the outer ring and the inner ring and cause the outer ring to radially compress the intermediate ring and the latter to radially compress the inner ring.

3. A shock absorbing device comprising an outer longitudinally compressible and diametrically contractible ring, an intermediate ring diametrically contractible and expansible under contraction and expansion of the outer ring, an inner longitudinally contractible and expansible and diametrically contractible and expansible ring adapted to be contracted by said intermediate ring and to diametrically contract and expand under the diametrically contracting and expanding movements thereof, said inner ring embodying a volute plate spring having its convolutions stepped at the ends of the ring and reversely beveling the ring ends in the direction of the axis of the ring, and a compressing member having bearing portions, one engageable with the outer ring and the other engageable with the inner ring and operating in timed accord to first effect a preliminary compression of the outer ring and then to conjointly compress both the outer ring and the inner ring.

4. A shock absorbing device comprising an outer longitudinally compressible and diametrically contractible ring, an intermediate ring diametrically contractible and expansible under contraction and expansion of the outer ring, an inner longitudinally contractible and expansible and diametrically contractible and expansible ring adapted to diametrically contract and expand under the diametrical contracting and expanding movements of said intermediate ring, and a compressing member having preliminary and final bearing portions, the preliminary bearing portion being engageable with the outer ring and the final bearing portion being engageable with the inner ring, said bearing portions operating in timed accord to first effect a preliminary compression of the outer ring and then to jointly compress both the outer ring and the inner ring, the final bearing portion acting to axially compress the inner ring independently of the diametrical compression exerted upon it by contraction of the intermediate ring.

ERNST KREISSIG.